UNITED STATES PATENT OFFICE.

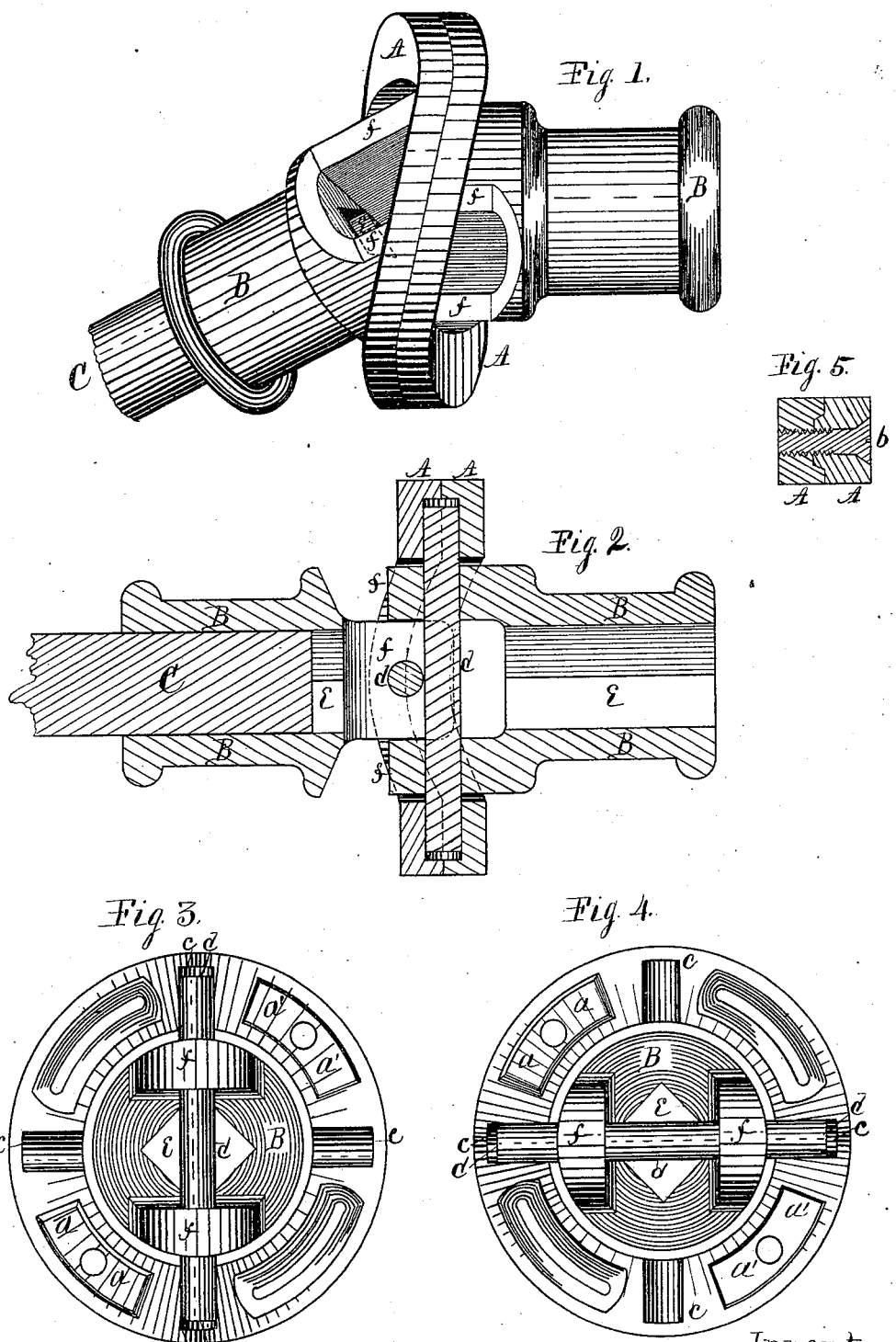

JOHN B. RALSTON, OF ROCKFORD, ILLINOIS.

IMPROVEMENT IN UNIVERSAL JOINTS.

Specification forming part of Letters Patent No. 197,495, dated November 27, 1877; application filed June 26, 1877.

*To all whom it may concern:*

Be it known that I, JOHN B. RALSTON, of the city of Rockford, in the county of Winnebago and State of Illinois, have invented a new and useful Improvement in Universal Joints, which improvement is fully set forth in the following specification and accompanying drawings, in which—

Figure 1 is a perspective view of a universal joint embodying my invention. Fig. 2 is a longitudinal central section, and Figs. 3 and 4 show the contiguous faces of the device when opened on the transverse annular division of the annular rings; and Fig. 5 is a transverse section of the annular rings cut centrally through one of the screws which holds the rings connected.

The object of my invention is to provide a cheap and reliable safety universal joint of general application when a universal joint is required, and particularly in connecting the tumbling-rods in thrashing and other similar machines.

To this end I have devised and constructed the universal joint represented in the accompanying drawings, in which A represents two plate-rings, of the peculiar waving form represented, that are provided on their contiguous faces with alternate prominences $a$ and depressions $a'$, fitted to receive the prominences which fix the relative position of the rings. These rings are held together firmly by suitable screws, as represented in section at $b$, Fig. 5. These rings are also fitted on their contiguous faces with semi-cylindrical grooves B, which, when the rings are placed together, form cylindrical grooves, the axes of which cross each other at right angles in the center of the rings on different planes, so that rods or bars $d$ placed in the grooves would cross each other without interfering, as represented in section in Fig. 2.

The radial semi-cylindrical grooves $c$ do not extend quite through the rings, so as to present a smooth, unbroken periphery, and in this instance are chilled to render them more durable and insure greater strength.

The rods or bars $d$ may be cut in proper lengths from bars of suitable material, of proper size to enter the grooves $c$.

B are heads, fitted with sockets $e$, to receive the ends of the tumbling rods or shafts C, and are also fitted with projecting ears $f$, the outside diameter of which is nearly equal to the inner diameter of the rings A. These ears are provided with transverse holes to receive the rods or bars $d$, which, when in place in the ears, the heads are placed in the rings, as at Figs. 3 and 4, with the ends of the rods or bars $d$ resting in the radial grooves $c$ in the contiguous faces of the rings A. The rings are then placed together, and secured in place by the screws $b$, which completes the joint, as represented in Fig. 1.

In practice it is found that this class of joints usually fail, first, from the wear of the journals on which the parts hinge, which, when worn, in most cases, render the joint worthless, or difficult and expensive to repair, all of which is, to a great extent, obviated in my improved joint, as the rods or bars $d$, which form the journals, are free to oscillate in both the rings and ears of the heads, which will greatly lessen the wear of the journals, and, should they become worn, can readily be repaired at a small cost by removing the screws and inserting new journal-bars, which may be cut to proper lengths from round bars of iron of proper size, which, when in place, and secured by means of the screws, will be again a complete joint.

By this method of construction I am enabled to produce a reliable universal joint of simple construction, easily repaired, with smooth exterior, rendering it a safety-coupling, at a small cost.

I claim as my invention—

1. In a universal joint, the combination, with the shaft-heads, of a two-part waving or undulating ring, provided with sockets for the reception of the journals for the shaft-heads, substantially as described.

2. The combination, with the shaft-heads, of a two-part waving or undulating ring, the contiguous faces of which are constructed with projections and depressions, whereby the sections of the ring are firmly held in place, substantially as described.

3. The combination, with the shaft-heads, of a sectional waving or undulating ring, each section of which is provided with semi-cylindrical grooves, to form bearings for the journals, which are thus adapted to have free rotary movement within the ring, and capable of ready replacement when worn, substantially as described.

JOHN B. RALSTON.

Witnesses:
JAMES FERGUSON,
A. O. BEHEL.